United States Patent [19]

Sari

[11] Patent Number: 4,633,482
[45] Date of Patent: Dec. 30, 1986

[54] METHOD OF AND ARRANGEMENT FOR DETERMINING THE OPTIMUM POSITION OF THE REFERENCE TAP OF AN ADAPTIVE EQUALIZER

[75] Inventor: Hikmet Sari, Creteil, France

[73] Assignee: U. S. Philips Corporation, New York, N.Y.

[21] Appl. No.: 671,381

[22] Filed: Nov. 14, 1984

[30] Foreign Application Priority Data

Nov. 14, 1983 [FR] France .............................. 83 18027

[51] Int. Cl.⁴ .............................................. H04B 3/14
[52] U.S. Cl. ......................................... 375/14; 333/18
[58] Field of Search ....................... 375/11, 12, 14, 15, 375/16; 333/18; 364/724; 367/45

[56] References Cited

U.S. PATENT DOCUMENTS

| 3,390,336 | 6/1968 | Di Toro | 375/14 |
| 4,021,738 | 5/1977 | Gitlin et al. | 375/14 |
| 4,047,013 | 9/1977 | Milewski | 375/14 |
| 4,320,517 | 3/1982 | Godard et al. | 375/13 |
| 4,483,009 | 11/1984 | Honda et al. | 375/14 |

Primary Examiner—Benedict V. Safourek
Attorney, Agent, or Firm—Thomas A. Briody; William J. Streeter; Leroy Eason

[57] ABSTRACT

A method of and an arrangement for determining the optimum position of the reference tap of a master adaptive equalizer which adapts itself to variations of the transmission characteristics of a transmission channel in a digital system for transmitting data which are in general complex, such adaptation being effected by modifying sets of coefficients of transversal filters which modify the transmitted symbols. Simultaneously with the operation of the master adaptive equalizer, and in consecutive analyzing periods, a selection is made in accordance with a selection algorithm of the optimum positions of the reference taps of transversal filters in a slave adaptive equalizer, the coefficients of which are adapted in accordance with an adaptation algorithm. A comparison is made between the symbols supplied by the master and slave adaptive equalizers in accordance with an error criterion, and when the error criterion indicates that the slave adaptive equalizer provides the best results the reference tap position and coefficients thereof are transferred to the master adaptive equalizer.

6 Claims, 3 Drawing Figures

METHOD OF AND ARRANGEMENT FOR DETERMINING THE OPTIMUM POSITION OF THE REFERENCE TAP OF AN ADAPTIVE EQUALIZER

BACKGROUND OF THE INVENTION

1. Field of the Invention

The present invention relates to a method of and an arrangement for determining the optimum position of the reference tap of an adaptive equalizer which adapts itself to variations of the channel of a digital transmission system, and more specifically for high-rate systems in which the transmission channel is not known in advance and/or is liable to vary in the course of time. Consequently, the invention is applicable to digital microwave links, to data transmission via switched telephone networks, to the digital transmission via cables (special networks of the Transpac type, etc . . . ).

2. Description of the Related Art

Multiple-path selective fading seriously affects the capacity of digital radio transmission systems. Similarly, the transmission of data via cables often results in distortion and intersymbol interference. Thus, to combat the disturbances appearing in the dispersive channels, it is necessary to perform adaptation procedures which render it possible to recover the transmitted data on receipt. However so as to follow adequately the fluctuations of the channel it is necessary that these adaptation procedures are effected automatically.

The adaptive equalizers arranged at the receiving end of the digital transmission systems ensure the regeneration of the symbols transmitted by the transmitter by determining the estimated symbols on the basis of adaptation and decision criteria.

Generally, the data $x_k$ obtained from the transmission channel are assumed to be complex data, which renders it necessary that the adaptive equalizers under consideration process simultaneously the real and imaginary components of said complex data. It will be evident that in the case of purely real data $x_k$ will be obtained as a direct result of such processing.

Conventionally, the adaptive equalizers are of two types:

either a non-recursive transversal filter in which N delayed samples, originating from the complex data $x_k$, are multiplied by N complex coefficients, the N results thus obtained being added together to define the received signal;

or a recursive transversal filter in which, in addition to a non-recursive transversal filter of the above type, there is a recursive branch, that is to say a branch which reintroduces in the equalizer, M complex data appearing at the output of the equalizer, these M data being multiplied respectively by M complex coefficients, thereafter added to the N data of the non-recursive branch, the recursive loop comprising inter alia a non-linear decision element.

The adaptation is effected on the basis of an error criterion and an algorithm which minimizes this error criterion.

It is also known that in certain circumstances it may be useful to have the adaptive equalizer be preceded by a filter which is matched to the impulse response of the channel. Nevertheless, in practice the impulse response of the channel is generally not known in advance and so use of a matched filter is not the best solution. When the adaptive equalizer is not preceded by a matched filter, the centre tap of the equalizer has been used as the reference tap. However, a better solution is to provide an adaptive selection procedure for the optimum position of the reference tap.

For a correct adaptation to the variations of the channel two adaptation procedures may be performed simultaneously:

a procedure for adapting the N+M coefficients;

a procedure for adapting the position of the reference tap, this position defining the delay of the adaptive equalizer and its performances.

The adaptation algorithm utilized for the N+M coefficients is, for example, a mean-square error stochastic gradient-type algorithm.

An arrangement for adjusting the position of the reference tap in an adaptive equalizer is described by SHAHID U. H. QURESHI in the article entitled "Adjustment of the Position of the Reference Tap of an Adaptive Equalizer", published in IEEE Transactions on Communications, Vol COM. 21, No. 9, pages 1046–1052, September 1973. That arrangement uses the known method of stochastic adjustment of the gradient of the mean-square error to determine the optimum position of the reference tap. Unfortunately, as is explained in said article, the convergence of this method to a global minimum cannot be guaranteed. In other words, the method may converge to an intermediate minimum, which does not correspond to the feasible optimum adaptation. There is consequently a risk of an imperfect adaptation, which diminishes the reliability of this method. On the other hand, even in the most advantageous case in which a convergence to a global minimum is obtained, the adaptation procedure causes fluctuations of the position of the reference tap around the point of equilibrium.

SUMMARY OF THE INVENTION

It is a first object of the present invention to render it possible to attain without fail the optimum adaptation of the position of the reference tap of an adaptive equalizer.

It is a second object of the present invention to avoid fluctuations of the position of the reference tap around the optimum position.

Thus, the invention relates to a method of and an arrangement for determining the optimum position of the reference tap of a master adaptive equalizer of the type defined in the opening paragraph, in which, simultaneously with the operation of the master adaptive equalizer and for consecutive analysing periods:

a selection is made, in a second adaptive equalizer called the slave adaptive equalizer, of the position of the reference tap and a subsequent adaptation of its coefficients in accordance with a selection algorithm and an adaptation algorithm respectively;

a comparison is made between the symbols supplied by the master and slave adaptive equalizers in accordance with an error criterion;

in the case in which the error criterion indicates that the slave adaptive equalizer provides the best results, said position and said coefficients are transferred from the slave adaptive equalizer to the master adaptive equalizer.

BRIEF DESCRIPTION OF THE DRAWINGS

Features of the invention will be more fully appreciated from the following description of exemplary embodiments when considered in conjunction with the accompanying drawings, in which.

For the sake of simplicity of the description, the abbreviations "master A.E." will be used hereinafter for the master adaptive equalizer and "slave A.E." for the slave adaptive equalizer.

DESCRIPTION OF THE PREFERRED EMBODIMENTS

Figure 1:
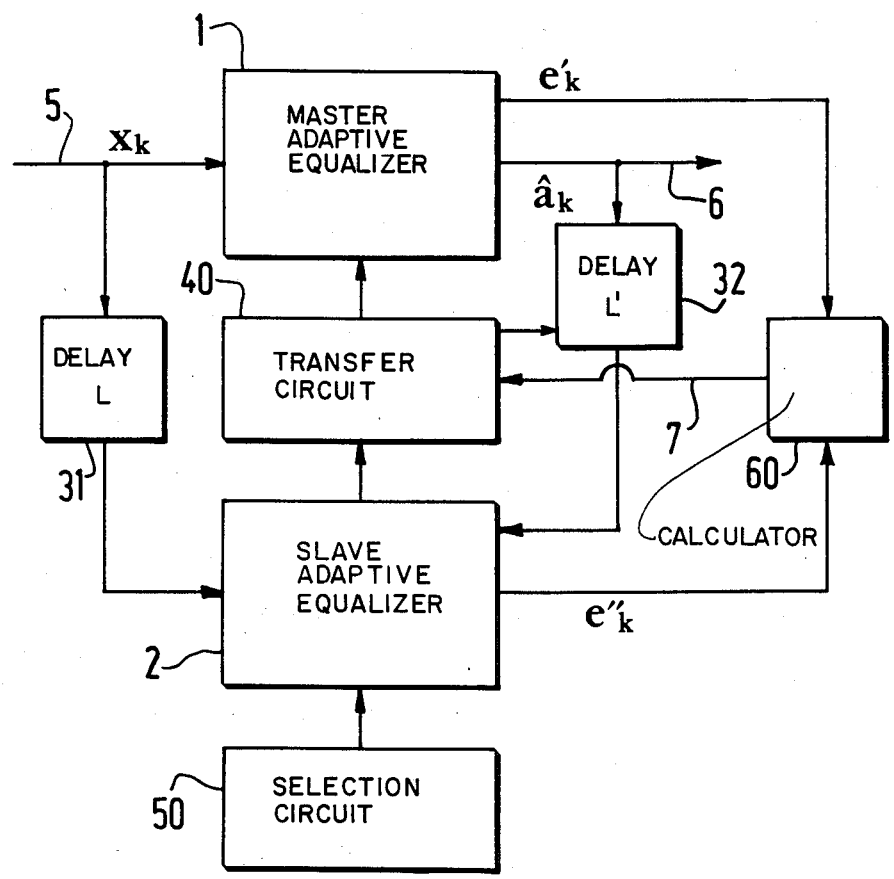
FIG. 1 shows a general block diagram of the master-slave adaptive equalizing arrangement.
Figure 2:
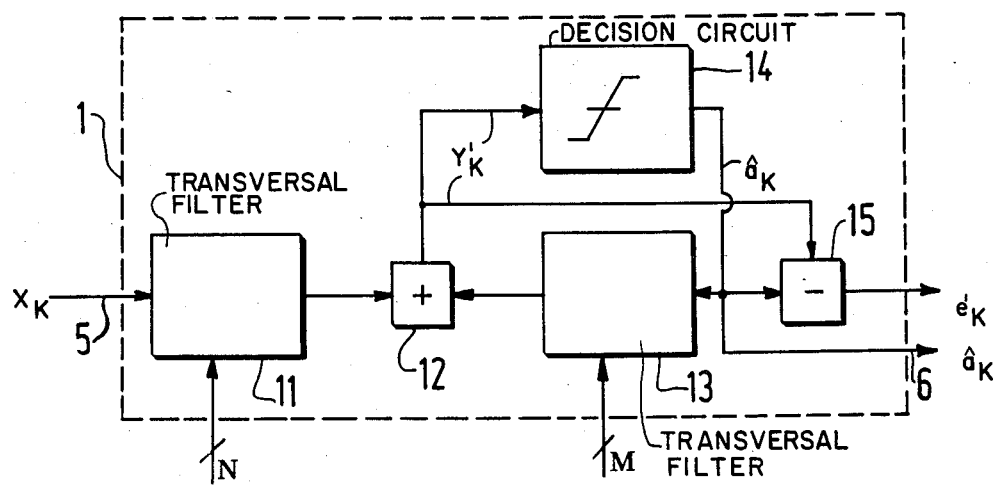
FIG. 2 shows a block diagram of the master adaptive equalizer.

The arrangement in FIG. 1 comprises a master A.E. 1 which is of a known structure as shown in FIG. 2 formed by:

(a) a transversal filter 11 having N coefficients and receiving the complex data $x_k$ originating from a transmission channel 5;

(b) a recursive loop consisting of the series arrangement of
 a transversal filter 13 having M coefficients and processing the estimated symbols $â_k$,
 an adder 12 receiving the symbols originating from the transversal filters 11 and 13 and producing the computed symbols $y'_k$;
 a decision circuit 14 which compares the real and imaginary components of each computed symbol $y'_k$ with a previously defined level and supplies from its output 6 the estimated complex symbols $â_k$;

(c) a subtractor 15 producing an error $e'_k$ between the computed symbols $y'_k$ and the estimated symbols $â_k$, such that $e'_k = y'_k - â_k$.

In accordance with the stochastic gradient algorithm the transversal filter coefficients are adapted in the following manner.

At an instant k, the master A.E. will have in its transversal filter 11 the coefficients, expressed as a tap vector:

$$C_k = (c'_0{}^{(k)}, c'_1{}^{(k)}, \ldots c'_{N-1}{}^{(k)})^T$$

and in the recursive filter 13 the coefficients, expressed a as tap vector:

$$D'_k = (d'_1{}^{(k)}, d'_2{}^{(k)}, \ldots d'_M{}^{(k)})^T$$

where T indicates that a transposed vector is involved.

The stochastic gradient algorithm is now obtained by deducing the respective vectors $C'_{k+1}$ and $D'_{k+1}$ from the preceding vectors $C'_k$ and $D'_k$ by:

$$C_{k+1} = C_k - \alpha \cdot X_k^* e'_k$$

$$D'_{k+1} = D'_k - \alpha \cdot \hat{A}_{k-p}^* e'_k$$

with at the instant k the notation:

$$X_k = (x_k, x_{k-1}, \ldots, x_{k-N+1})^T$$

$$\hat{A}_{k-p}(â_{k-p}, â_{k-p-1}, \ldots, â_{k-p-M+1})^T$$

consequently, $$e'_k = C^T \cdot x_k + D'^T \cdot \hat{A}_{k-p} - â_{k-p+1} \quad (1)$$

where:
 the asterisk indicates the complex conjugated value;
 the letter p indicates that the position of the reference tap at the instant k is the coefficient of the order p;
 $â_{k-p+1}$ is the estimated symbol at the output of the master A.E.;
 $\alpha$ is a parameter denoted as the step-size of the algorithm (small positive constant).

The arrangement in FIG. 1 further employs a slave A.E. 2, which operates with a certain time delay in parallel with the master A.E. 1 and enables determination of the optimum position of the reference tap.

Figure 3:
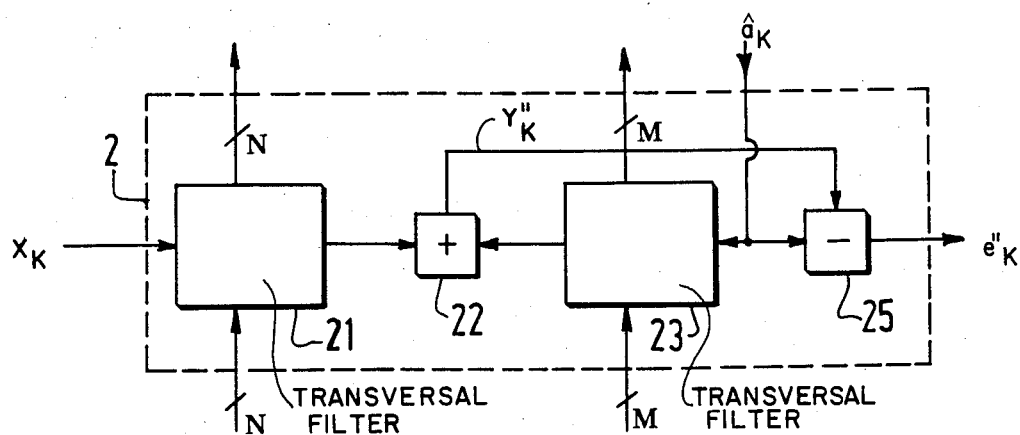
FIG. 3 shows a block diagram of the slave adaptive equalizer.

As shown in FIG. 3 the slave A.E. is formed by:

(a) a transversal filter 21 having N coefficients and processing the delayed complex data $x_k$;

(b) a recursive portion comprising:
 a transversal filter 23 having M coefficients and processing the delayed estimated symbols $â_k$, originating from the master A.E.;
 an adder 22 receiving the data supplied by the transversal filters 21 and 23 and producing the computed samples $y''_k$;

(c) a subtractor 25 producing an error $e''_k$ between the computed symbols $y''_k$ and the estimated symbols $â_k$, such that $e''_k = y''_k - â_k$.

As shown in FIG. 1, the complex data $x_k$ and the estimated $â_k$ which are entered into the slave A.E. are delayed by a first delay device 31 and a second delay device 32, respectively.

In its recursive portion the slave A.E. 2 has no decision circuit, in contrast with the master A.E. Actually, the master A.E. 1 is the equalizer which operates to follow the variations of the transmission channel. The estimated symbols $â_k$ are the transmitted symbols with a very high probability. The slave A.E. 2, according to the described selection procedure and as will be explained hereinafter, will produce, in the first stages of its search for the optimum reference tap position, samples which may be rather faulty. So as to ensure that the selection procedure converges rapidly, it is preferable to utilize the estimated symbols $â_k$ produced by the master A.E. 1 neither than by including a further decision element in the recursive portion of the slave A.E. 2

The selection procedure is as follows. At a given instant the master A.E. 1 is in the normal operating mode for following the variations of the transmission channel 5, and via a selection circuit 50 a position of the reference tap is assigned to the transversal filter 21 of slave A.E. 2. As that filter has N taps, the position of the reference tap may, for example, be chosen from successively the first to the $N^{th}$ position. It is alternatively possible to assume the centre tap to be the reference tap, and to move progressively to one side and the other. Thus, with N being equal to 7 taps, a possible choice is to assign to the position of the reference tap the position which corresponds to the fourth tap, and to try thereafter, one after the other, the third and fifth taps, or the other way round, thereafter the second and sixth taps, or the other way round, and so forth. It is alternatively possible to start with the position of the reference tap currently employed in the master A.E., and to effect similar sequential selections.

At each selection, the slave A.E. 2 adapts the N+M coefficients of the transversal filters 21 and 23 in accordance with an adaptation algorithm, for example the stochastic gradient algorithm for the mean-square error. The means for implementing that method is well known in equalizing systems, and so is not shown in the Figures.

For its adaptation, the slave A.E. 2 employs the estimated symbols $\hat{a}_k$ provided by the master A.E. Now, when one considers the extreme case for the positions of the reference taps, simultaneously, in the slave A.E. 2 and in the master A.E. 1, this leads to the following extreme situation: if q=1 for the slave A.E. and p=N for the master A.E., and considering that an equation similar to the equation (1) holds for the slave A.E. (q being substituted for p in this case), it will be evident that the slave A.E. needs the sample $\hat{a}_k$ to adapt itself and that in accordance with the equation (1), the master A.E. supplies at that instant the sample $\hat{a}_{k-N+1}$. To take this into account, a delay L such that L≧N−1 symbol periods is necessary. Thus, the first delay device 31 produces a delay which in this case is chosen to be L=N−1 symbol periods.

For similar reasons, when the positions of the reference taps are located in any non-extreme positions, it is necessary to provide an additional delay L', represented by the second delay device 32 in FIG. 1, which delay will be variable in accordance with the respective locations of the positions of the reference taps of the two transversal filters of A.E. 1.

This delay L' is defined in the following manner: at the instant k the delay device 32 has the sample $\hat{a}_{k-p}$ at its input and the sample $\hat{a}_{k-p-L'}$ at its output. Similarly, the transversal filter 23 in the recursive portion of the slave A.E. 2 has the sample $A_{(k-L)-q}$ at its input. It is therefore necessary that the indices of the samples applied to the slave A.E. be identical, i.e.:

$$k-p-L'=k-L-q$$

or:

$$L'=L+q-p \quad (2)$$

The delay L' is at its maximum when p=1 and q=N, or $L'=L+N-1$, and at its minimum when p=N and q=1 or $L'=L-M+1$, and for $L=N-1$ one has the condition:

$$0\leq L' \leq 2(N-1). \quad (3)$$

In a manner similar to that employed in the master A.E., the coefficients of the slave A.E. will be adapted by means of the stochastic gradient method.

The coefficients of the transversal filter 21 in FIG. 3 are designated by:

$$C''_k=(c''_0{}^{(k)}, c''_1{}^{(k)}, \ldots, c''_{N-1}{}^{(k)})^T$$

and those of the recursive filter 23 are designated by:

$$D''_k=(d''_1{}^{(k)}, d''_2{}^{(k)}, \ldots, d''_M{}^{(k)})^T$$

and are adapted to the variations of the transmission channel in accordance with:

$$C''_{k+1}=C''_k-\beta \cdot X^{\neq}_{k-N+1} \cdot e''_k$$

$$D''_{k+1}=D''_k-\beta \cdot \hat{A}^{\neq}_{k-q-N} \cdot e''_k$$

where $X^{\neq}_{k-N+1}$ and $\hat{A}^{\neq}_{k-q-N}$ are defined as in the master A.E., $\beta$ is a parameter similar to the parameter $\alpha$ defined in the foregoing, the letter q indicates that the position of the reference tap at the instant k is the coefficient of the order q, and $e''_k$ is defined by:

$$e''_k=C''^T \cdot X_{k-N+1}+D''^T \cdot \hat{A}_{k-q-N+1}-\hat{a}_{k-q-N+2} \quad (4)$$

Other coefficient adaptation algorithms may alternatively be used without departing from the scope of the invention.

The adaptation will be effected during a time interval K.T which represents K times the symbol period T, at the end of which, the coefficients having converged, a start is made with processing the errors $e'_k$ produced by the master A.E. and $e''_k$ produced by the slave A.E.

At the end of the interval K.T, a calculating arrangement 60 in FIG. 1 starts calculating the mean-square values relative to the errors $e'_k$ and $e''_k$ over J consecutive symbols, such that:

$$E(|e'_k|^2) = \frac{1}{J} \sum_{j=1}^{J} |e'_{k+j}|^2$$

$$E(|e''_k|^2) = \frac{1}{J} \sum_{j=1}^{J} |e''_{k+j}|^2$$

The calculating arrangement 60 also effects the comparison of the two mean-square values $E(|e'_k|^2)$ and $E(|e''_k|^2)$, and applies a control signal 7 to the transfer circuit 40:

If $E(|e'_k|^2) \leq E(|e''_k|^2)$, the control signal indicates that the position of the reference tap of the master equalizer is not to be modified;

If $E(|e'_k|^2) > E(|e''_k|^2)$, the control signal indicates that the position of the reference tap and the coefficients themselves are to be transferred from the slave A.E. to the master A.E.

At the end of this error calculating period J.T, the selection circuit 50 will transfer to the slave A.E. the subsequent position of the reference tap, in accordance with the selected criterion, and the test and transfer procedures described above are repeated for each new position of the reference tap. Each time a new position is imposed on the slave A.E., the coefficients are re-initialized, that is to say the coefficient chosen as the reference tap is set to 1 and all the N−1 and M further coefficients are set to 0, the selection of the reference tap taking place over only the N coefficients. The adaptation procedure then proceeds during the period K.T, followed by the error calculating procedure during the period J.T at the end of which the transfer of the coefficients is possibly effected.

The selection circuit may, for example, be a shift register.

The new value of delay L', defined by the equation (3) for the case in which the delay L is fixed at $L=M-1$ or defined by equation (2) for the general case, is determined by the transfer circuit 40 on the basis of the optimum positions of the reference taps of the master A.E. as indicated by the control signal 7. Circuit 40 transfers that value of L' to delay device 32. The delay device 32 is formed by, for example, a shift register of the length L+N−1 having a serial inputs and parallel outputs, and a demultiplexer circuit.

When the N positions have been checked thus, and the choice of the optimum position has possibly been transferred to the master A.E. in accordance with the principle of the invention, the procedure for selecting the reference tap of the slave A.E. already described in the foregoing is repeated, completely or partly, so as to determine a new optimum position which is better adapted to the characteristics of the transmission channel, which characteristics are always in a stage of change.

Shifting the position of the reference tap changes the delay with which the transmitted symbols are obtained at the output of the equalizer. If no precautions were taken, a symbol would be lost at each shift to the left of the reference tap of the master A.E., and a symbol would be repeated at each shift of this tap to the right. In accordance with the invention this problem is overcome in the following way: the symbol which would normally be lost during the shift to the left can be recovered at the output of the slave A.E., and repeating of the symbol can be avoided by disregarding the first decision of the master A.E. after each shift to the right of the reference tap.

The slave A.E. need not necessarily operate at the same rate as the master A.E., but may operate a lower rate, which then results in a less complicated realization. In that case the slave A.E. processes one symbol out of R symbols (R∈N). This has for its consequence that the convergence of the master A.E. is slowed down, taking account of the fact that the convergence procedure is a function of the number of iterations, and thus of the number of symbols taken into account. Similarly, the time to effect the comparison between the two errors $|e'_{k+j}|^2$ and $|e''_{k+j}|^2$ increases proportionally.

What is claimed is:

1. A method of determining the optimum position of the reference tap of a master adaptive equalizer which adapts itself to variations in the transmission characteristics of a channel of a digital transmission system for transmitting data symbols $x_k$ which are in general complex, such adaptation being effected by modifying sets of coefficients of a transversal filter comprised in the master adaptive equalizer and which modify the transmitted data symbols, characterized in that simultaneously with the operation of the master adaptive equalizer and in consecutive analyzing periods:

a selection is made, in a slave adaptive equalizer, of the position of a reference tap of a transversal filter therein and the coefficients of such filter are subsequently adapted, such selection and adaptation being in accordance with a selection algorithm and an adaptation algorithm, respectively;

a comparison is made between the symbols supplied by the master and slave adaptive equalizers in accordance with an error criterion; and in the case in which the error criterion indicates that the adaptation provided by the slave adaptive equalizer results in less symbol error than the adaptation provided by the master adaptive equalizer, the reference position and the coefficients of the transversal filter of the slave adaptive equalizer are transferred to the transversal filter of the master adaptive equalizer.

2. A method as claimed in claim 1, characterized in that the adaptation algorithm for the transversal filter coefficients of the slave adaptive equalizer is a stochastic gradient algorithm for the mean-square error.

3. A method as claimed in claim 1 or 2, characterized in that the selection algorithm for selecting the position of the reference tap of the transversal filter of the slave adaptive equalizer comprises effecting sequential selections of each possible position of such reference tap.

4. A method as claimed in any of the claims 1 or 2, characterized in that said error criterion is defined and applied as follows:

an error $e'_k$ is determined with respect to the calculated symbols $y'_k$, from which the transmitted symbols are defined as being the estimated symbols $â_k$ obtained after a decision operation, which symbols are all produced by the master adaptive equalizer, the error being defined by $$e'_k = y'_k - â_k;$$

an error $e''_k$ is determined between the calculated symbols $y''_k$ of the slave adaptive equalizer and the estimated symbols $â_k$ produced by the master adaptive equalizer, in accordance with $$e''_k = y''_k - â_k;$$

the errors $e'_k$ and $e''_k$ are compared by comparing their respective mean square values $E(|e'_k|^2)$ and $E(|e''_k|^2)$;

when $E(|e''_k|^2) < E(|e'_k|^2)$, the position of the reference tap and the determined coefficients of the transversal filter of the slave adaptive equalizer are transferred to the transversal filter of the master adaptive equalizer.

5. An adaptive equalizing circuit comprising:

a master adaptive equalizer for receiving complex data symbols $x_k$ from a transmission channel and supplying, at its output, estimated symbols $â_k$ and an error $e'_k$ between such estimated symbols $â_k$ and calculated symbols $y'_k$, such master adaptive equalizer comprising a transversal filter having N coefficients;

first and second delay devices acting respectively on the complex data symbols $x_k$ and the estimated symbols $â_k$, the first delay device producing a delay L such that $L \geq N-1$ and the second delay device producing a delay $L'$ which is defined by a transfer circuit;

a slave adaptive equalizer, comprising a transversal filter the position of whose reference tap is consecutively chosen by a selection circuit, such slave equalizer receiving the delayed complex data $x_k$ from the first delay device and the delayed estimated symbols $â_k$ from the second delay device, and producing the error $e''_k = y''_k - â_k$ between the estimated symbols $â_k$ of the master adaptive equalizer as delayed by the second delay device and the calculated symbols $y''_k$ of the slave adaptive equalizer;

and a calculation circuit which receives the error $e''_k$ from the slave adaptive equalizer and the error $e'_k$ from the master adaptive equalizer, determines and compares with one another their mean-square values, and produces a comparison control signal;

said transfer circuit being adapted to transfer the coefficients of the slave adaptive equalizer to the master adaptive equalizer under the control of the control signal originating from the calculation circuit, and to determine the value of the delay $L'$ to be put into effect by the second delay device.

6. An adaptive equalizing arrangement as claimed in claim 5, characterized in that the calculation circuit determines the optimum position of the reference tap of the master adaptive equalizer for adapting to the transmission characteristics of the transmission channel.

* * * * *